US010874055B2

United States Patent
Gerdeman et al.

(10) Patent No.: US 10,874,055 B2
(45) Date of Patent: *Dec. 29, 2020

(54) AUGER FLIGHT EXTENSION FOR A FARM IMPLEMENT

(71) Applicant: Unverferth Manufacturing Company, Inc., Kalida, OH (US)

(72) Inventors: Shawn W. Gerdeman, Delphos, OH (US); Michael D. Van Mill, Shell Rock, IA (US)

(73) Assignee: UNVERFERTH MANUFACTURING COMPANY, INC., Kalida, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,509

(22) Filed: Sep. 16, 2019

(65) Prior Publication Data
US 2020/0008356 A1    Jan. 9, 2020

Related U.S. Application Data

(63) Continuation of application No. 15/949,674, filed on Apr. 10, 2018, now Pat. No. 10,448,575.

(51) Int. Cl.
*A01D 90/10* (2006.01)
*B60P 1/40* (2006.01)

(52) U.S. Cl.
CPC ............... *A01D 90/10* (2013.01); *B60P 1/40* (2013.01)

(58) Field of Classification Search
CPC ............... B60P 1/42; B60P 1/40; A01F 12/46
See application file for complete search history.

(56) References Cited

U.S. PATENT DOCUMENTS

| 2,320,612 | A |   | 6/1943 | Kandle |
| 3,092,241 | A |   | 6/1963 | Dubie |
| 3,575,306 | A | * | 4/1971 | Obermeyer ............... B60P 1/40 414/523 |
| 5,013,208 | A | * | 5/1991 | Grieshop ................. B60P 1/40 414/519 |
| 5,099,984 | A |   | 3/1992 | Kuzub |
| 5,100,281 | A | * | 3/1992 | Grieshop ................. B60P 1/40 414/526 |
| 5,119,931 | A |   | 6/1992 | Barenthsen |
| 5,145,462 | A |   | 9/1992 | Tanis et al. |
| 5,340,265 | A | * | 8/1994 | Grieshop ................. B60P 1/40 414/519 |
| 5,601,362 | A |   | 2/1997 | Schuler |
| 5,876,176 | A |   | 3/1999 | Smith et al. |
| 6,050,894 | A |   | 4/2000 | Johnson |

(Continued)

*Primary Examiner* — Kaitlin S Joerger
(74) *Attorney, Agent, or Firm* — Rothwell, Figg, Ernst & Manbeck, P.C.

(57) ABSTRACT

A farm implement having an auger assembly that includes a first auger section with a first auger shaft and a first helical flight array and a second auger section with a second auger shaft and a second helical flight array. When the auger assembly is set in the operating position, a leading edge of the first helical flight array opposes a trailing edge of the second flight array, and the leading edge is spatially separated from the trailing edge by a gap. The auger assembly further includes a first flight extension detachably mounted to the leading edge of the first helical flight array and/or a second flight extension detachably mounted to the trailing edge of the second helical flight array.

10 Claims, 14 Drawing Sheets

(56) References Cited

U.S. PATENT DOCUMENTS

| | | | |
|---|---|---|---|
| 6,083,102 A | 7/2000 | Pfeiffer et al. | |
| 6,129,629 A | 10/2000 | Dammann et al. | |
| 6,688,970 B2 | 2/2004 | Tanis | |
| 7,051,865 B1 * | 5/2006 | Zhao | B65G 33/265 |
| | | | 198/676 |
| 7,191,965 B2 | 3/2007 | Neier et al. | |
| 7,347,616 B2 | 3/2008 | Albright | |
| 7,507,016 B2 | 3/2009 | Huberdeau et al. | |
| 7,815,136 B2 | 10/2010 | Amston | |
| 7,871,024 B2 | 1/2011 | Peeters et al. | |
| 8,047,757 B1 * | 11/2011 | Wood | A01D 90/10 |
| | | | 198/668 |
| 8,585,343 B2 * | 11/2013 | Wood | A01D 90/10 |
| | | | 414/523 |
| 8,702,368 B2 | 4/2014 | Van Mill et al. | |
| 9,039,340 B2 | 5/2015 | Van Mill et al. | |
| 9,102,478 B2 | 8/2015 | Van Mill et al. | |
| 9,127,506 B2 * | 9/2015 | Stimpfle-Ziegler | E02D 5/36 |
| 9,216,681 B1 | 12/2015 | Van Mill et al. | |
| 9,272,653 B2 | 3/2016 | Van Mill et al. | |
| 9,706,713 B2 | 7/2017 | Van Mill et al. | |
| 9,723,789 B2 | 8/2017 | Van Mill et al. | |
| 9,724,656 B2 | 8/2017 | Pellman | |
| 9,848,536 B2 | 12/2017 | Van Mill et al. | |
| 10,226,052 B2 * | 3/2019 | Shell | A23B 4/062 |
| 2007/0172338 A1 * | 7/2007 | Reimer | A01F 12/46 |
| | | | 414/339 |
| 2009/0321154 A1 * | 12/2009 | Johnson | B60P 1/42 |
| | | | 180/53.4 |
| 2010/0209223 A1 * | 8/2010 | Van Mill | A01B 73/00 |
| | | | 414/526 |
| 2011/0121114 A1 | 5/2011 | Neier et al. | |
| 2014/0044511 A1 * | 2/2014 | Wood | B60P 1/42 |
| | | | 414/526 |
| 2014/0365170 A1 * | 12/2014 | Van Mill | A01D 90/12 |
| | | | 702/173 |
| 2015/0223400 A1 * | 8/2015 | Van Mill | B60P 1/42 |
| | | | 414/505 |
| 2015/0313080 A1 * | 11/2015 | Matousek | A01D 61/008 |
| | | | 414/468 |
| 2016/0362036 A1 * | 12/2016 | Grodecki | B60P 1/40 |
| 2018/0027736 A1 * | 2/2018 | Van Mill | A01D 90/10 |
| 2019/0090495 A1 * | 3/2019 | Shell | F28F 5/06 |

\* cited by examiner

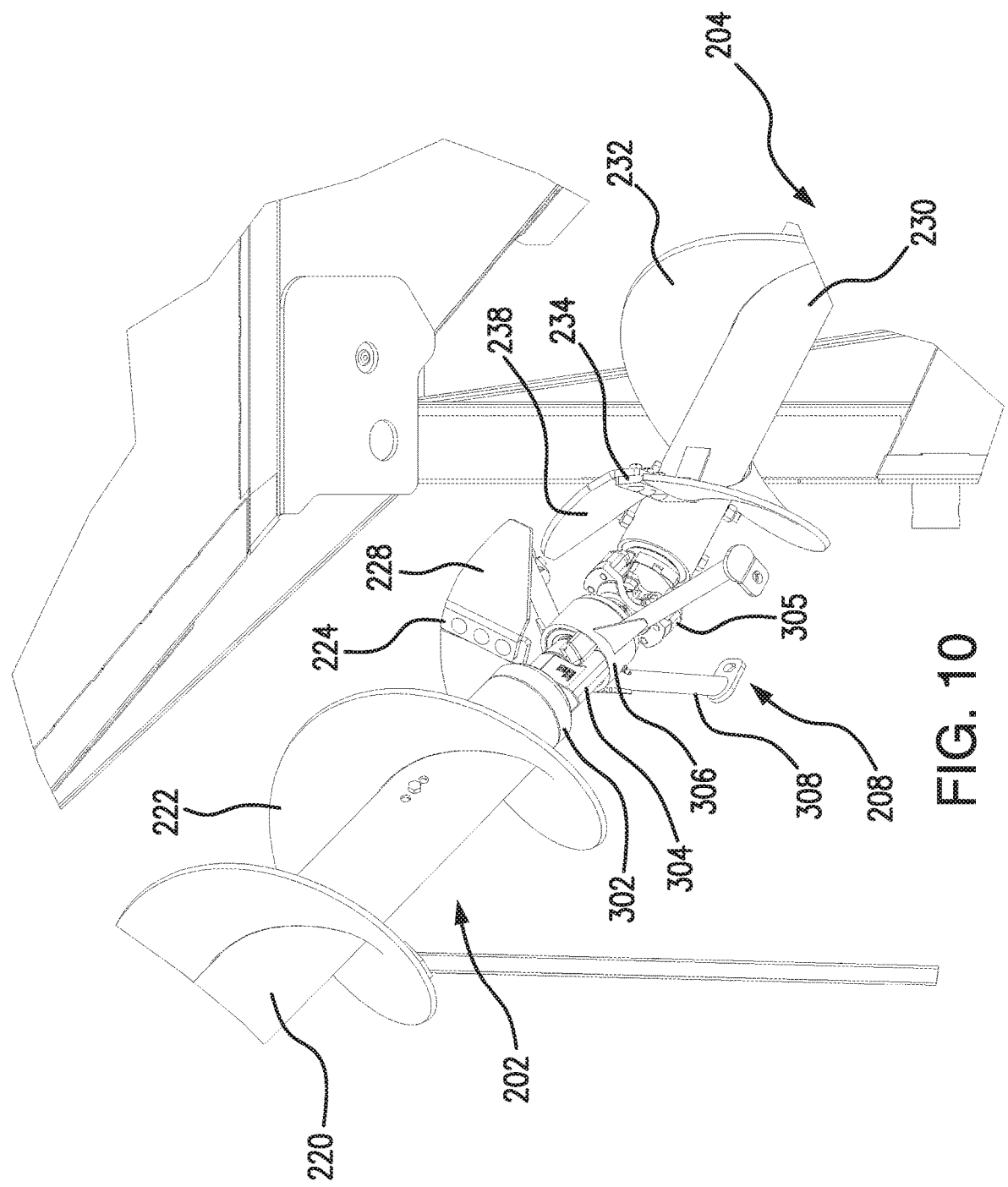

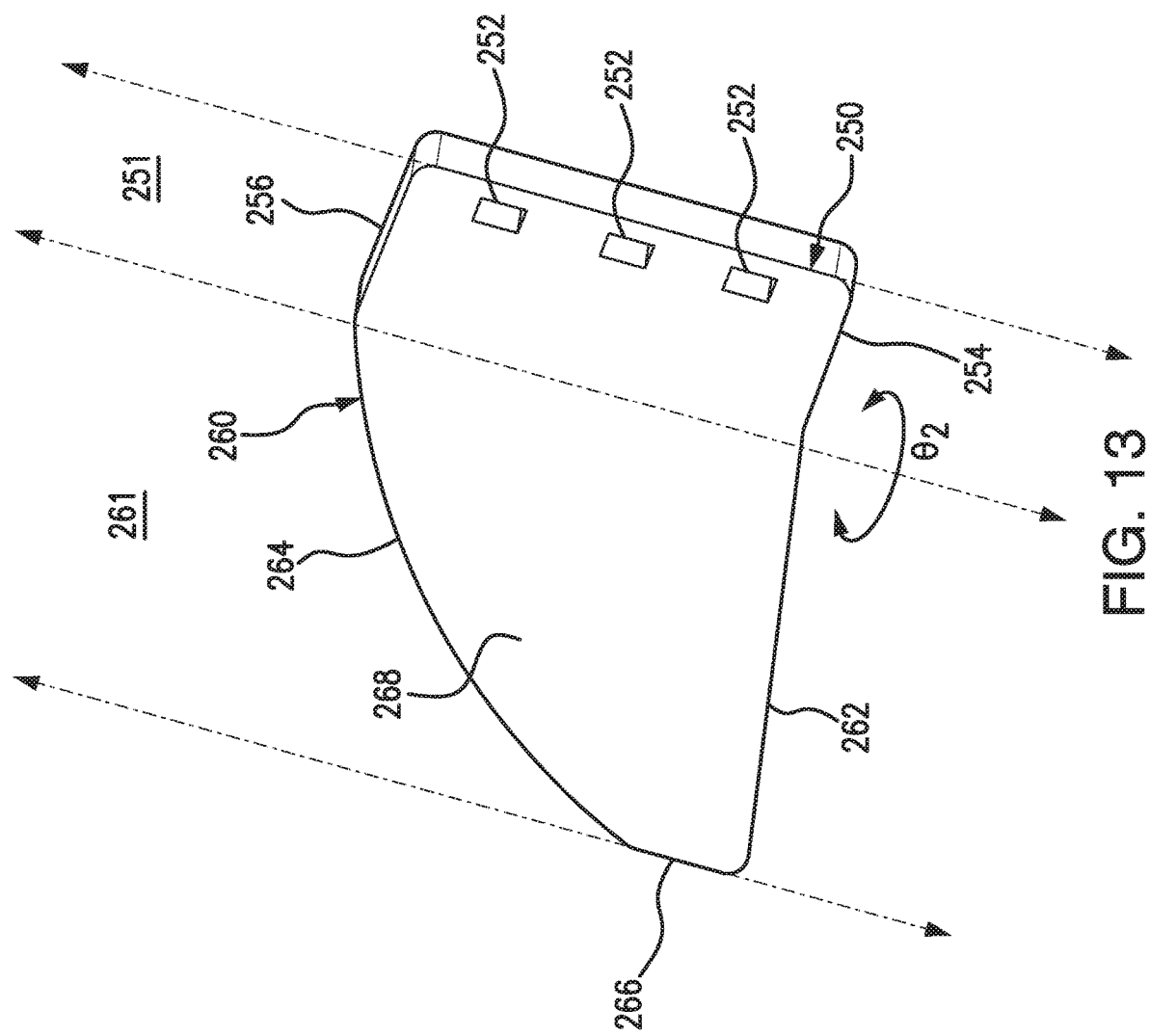

AUGER FLIGHT EXTENSION FOR A FARM IMPLEMENT

CROSS-REFERENCE TO RELATED APPLICATION

This application is a continuation of U.S. application Ser. No. 15/949,674, filed on Apr. 10, 2018, the disclosure of which is incorporated herein by reference in its entirety.

FIELD OF THE DISCLOSURE

This disclosure relates generally to farm implements, and more particular, to grain carts having folding auger assemblies.

BACKGROUND

In agriculture, augers are frequently used to move an agricultural material from a cart to another cart, silo, truck, or other storage facility. A typical auger for a grain cart includes an auger screw that is housed inside a tubular housing. An intake portion of the auger assembly can draw from a hopper (usually by gravity) attached to it to receive grain or other material from the hopper and the other end (i.e., the discharge end) has a chute or the like to guide the grain or other material into its destination.

As a grain cart with a fully extended auger can be somewhat unwieldy during transport, many grain carts employ folding augers that can open to an operating position and fold to a transport position. In general, a folding auger assembly includes a lower auger assembly and an upper auger assembly, in which the upper auger assembly moves with respect to the lower auger assembly between the operating position and the transport position. Accordingly, folding augers typically include a coupling assembly disposed at a junction between the upper and lower auger assemblies and received in the tubular housing, whereby the coupling assembly allows one end of the lower auger screw to releasably connect to one end of the upper auger screw when the auger assembly is in the operating position.

However, the coupling assembly typically includes several components in order to translate rotation of the lower auger screw to the upper auger screw while keeping the auger screws intact. Consequently, void space is provided between the ends of the auger screws to afford sufficient room for all the components of the coupling assembly. Moreover, as augers have increased in size over the years to provide a greater throughput, coupling assemblies have increased in size, as well, by including more components, such as, for example, a flexible connector. Accommodating room for the coupling assembly in the auger assembly, especially for coupling assemblies with several components, increases the void space between the adjacent ends of the upper and lower auger screw. A higher volume of grain material tends to collect in that increased void space between the upper and lower auger assemblies compared to other areas of the auger assembly. The buildup of grain material at the junction between the upper and lower auger assemblies causes higher grain pressure pushing on the auger fighting edge, thereby resulting in a higher wear rate on the auger fighting edge.

Past practices addressed the problem of increased fighting wear by welding more material to the edge and/or face of the fighting or applying a wear resistance material to the surface of the fighting. However, welding more material or applying a wear resistance material increases the cost, the complexity, and the labor demand for the manufacturing process of the auger assembly. In particular, it has been challenging to weld a strip of metal to the edge of the blade where the metal strip matches the profile and shape of the fighting. Another problem is that the welded strips cannot be replaced without replacing the entire section of flighting when servicing the metal strip for repair.

Another common approach to increase fighting life is fastening plastic shoes to the auger flighting. However, the plastic shoes are typically not strong enough to be installed on the fighting without further support. Moreover, helical fighting predominantly made of plastic are typically incorporated in smaller-sized augers that operate at lower speeds (e.g., less than 500 RPM). Plastic fighting tends to deflect more as the speed of the auger increases. Auger assemblies for common sized grain carts operate at higher RPM's to expedite the unloading time. Incorporating plastic fighting in each section of an auger assembly for a grain cart would hinder the balancing the auger assembly, as the junction between the sections would result in greater deflection.

Furthermore, it is generally desirable to employ augers that move grain as quickly as possible (i.e., to employ augers that have high throughput). To increase the throughput, the diameter of the auger tube and auger fighting have been increased so that the auger assembly may handle a greater volume of grain. However, increasing the diameter of the auger tube and fighting results in more grain material in the void space between the adjacent ends of the upper and lower auger screw. The higher volume of grain material stuck between the ends of the upper and lower auger screws tends to be lifted by the lower auger assembly repeatedly without being captured by the upper auger assembly, thereby increasing the torque demand by the auger assembly to convey the grain material through the auger assembly. In addition, grain stuck at the junction between the upper and lower auger assemblies tends to drop to the ground when the auger assembly folds back to the transport position, resulting in a loss of grain material.

SUMMARY

Accordingly, there is a need to provide an improved auger assembly for a farm implement that extends the fighting of the augers to minimize the void space disposed along the joint between upper and lower auger sections while not interfering with the operation of the joint components. Extending the fighting of the augers to minimize the void space without interfering with the operation of the joint components provides the significant advantages in promoting the movement of grain from the lower auger assembly to the upper auger assembly, reducing the likelihood of wear to the auger fighting, and minimizing the torque demand for the auger assembly.

According to a first aspect, embodiments of a farm implement are provided. The farm implement may comprise a wheeled frame, a container mounted on the frame and configured to hold agricultural material, and an auger assembly configured to convey agricultural material held in the container. The auger assembly may comprise a first auger section comprising a first auger shaft configured to rotate about a longitudinal axis of the first auger section and a first helical flight array disposed along and projected from the first auger shaft. The first helical flight array may comprise a leading edge proximate an end of the first auger shaft. The auger assembly may comprise a second auger section comprising a second auger shaft configured to rotate about a longitudinal axis of the second auger section and a second helical flight array disposed along and projected from the second auger shaft. The second helical flight array may comprise a trailing edge proximate an end of the second auger shaft. The auger assembly may comprise a joint configured to releasably connect the end of the first auger shaft to the end of the second auger shaft when the auger assembly is set in an operating position such that the leading edge of the first helical flight array opposes the trailing edge of the second flight array. The leading edge may be spatially separated from the trailing edge by a gap when the auger assembly is set in the operating position. The auger assembly may comprise a first flight extension detachably mounted to either one of the leading edge of the first helical flight array or the trailing edge of the second helical flight array. The first flight extension may extend into the gap when the auger assembly is set in the operating position such that the first flight extension is configured to convey agricultural material from the first auger section to the second auger section of the auger assembly.

In some embodiments, the longitudinal axis of the first auger section may be oriented at an angular offset relative to said longitudinal axis of the second auger assembly when the auger assembly is set in the operating position. In some embodiments, the auger assembly may comprise a second flight extension detachably mounted to the other one of the leading edge of the first helical flight array or the trailing edge of the second helical flight array, wherein the second flight extension extends into the gap when the auger assembly is set in the operating position such that the second flight extension is configured to convey agricultural material from the first auger section to the second auger section of the auger assembly. In some embodiments, the first flight extension may be detachably mounted to the leading edge of the first helical flight array, and the second flight extension may be detachably mounted to the trailing edge of the second helical flight array, wherein the first flight extension may extend toward the trailing edge of the second flight array, and the second flight extension may extend toward the leading edge of the first array when the auger assembly is set in the operating position. In some embodiments, the farm implement is a grain cart. In some embodiments, the second auger section may be pivotable relative to the first auger section between the operating position and a transport position, and the end of the first auger shaft may be disconnected from the end of the second auger shaft when the auger assembly is set in the transport position.

In some embodiments, the joint assembly may comprise a joint configured to transmit rotational forces from the first auger shaft to the second auger shaft when the auger assembly is set in the operating position. In some embodiments, the joint assembly may comprise a drive bearing hanger connected to least one of the first and second auger sections. The drive bearing hanger may be configured to hold at least one of the first and second auger shafts at angular offset position relative to the other one of the first and second auger shafts when the auger assembly is set in the operating position. In some embodiments, the joint may comprise support legs each having a proximal end connected to the drive bearing hanger and a distal end connected to a housing of at least one of the first and second auger sections, and the support legs are circumferentially spaced apart along the drive bearing hanger such that a void region extends in a circumferential direction between each pair of adjacent support legs and in an axial direction between the proximal and distal ends of the support legs.

In some embodiments, the joint assembly may comprise a first auger coupling portion disposed at the end of the first auger shaft and a second auger coupling portion disposed at the end of the second auger shaft. The first auger coupling portions may be configured to releasably connect to the second auger coupling portion when the auger assembly is set in the operating position. In some embodiments, the first flight extension and the second flight extension each may comprise a flange portion configured to be mounted to a respective leading edge of one of the first and second helical flight arrays and a blade portion projecting away from the respective leading edge of one of the first and second helical flight arrays. In some embodiments, the flange portion may define a first plane and the blade portion may define a second plane that extends obliquely to the first plane.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

FIG. 10 is a detailed view of the joint assembly coupling the upper auger section to the lower auger section with the auger assembly set in the operating position, and the tubular housing and the flange are omitted from the figure, according to an exemplary embodiment.

FIG. 13 is a perspective view of a flight extension according to an exemplary embodiment.

DETAILED DESCRIPTION

Figure 1:
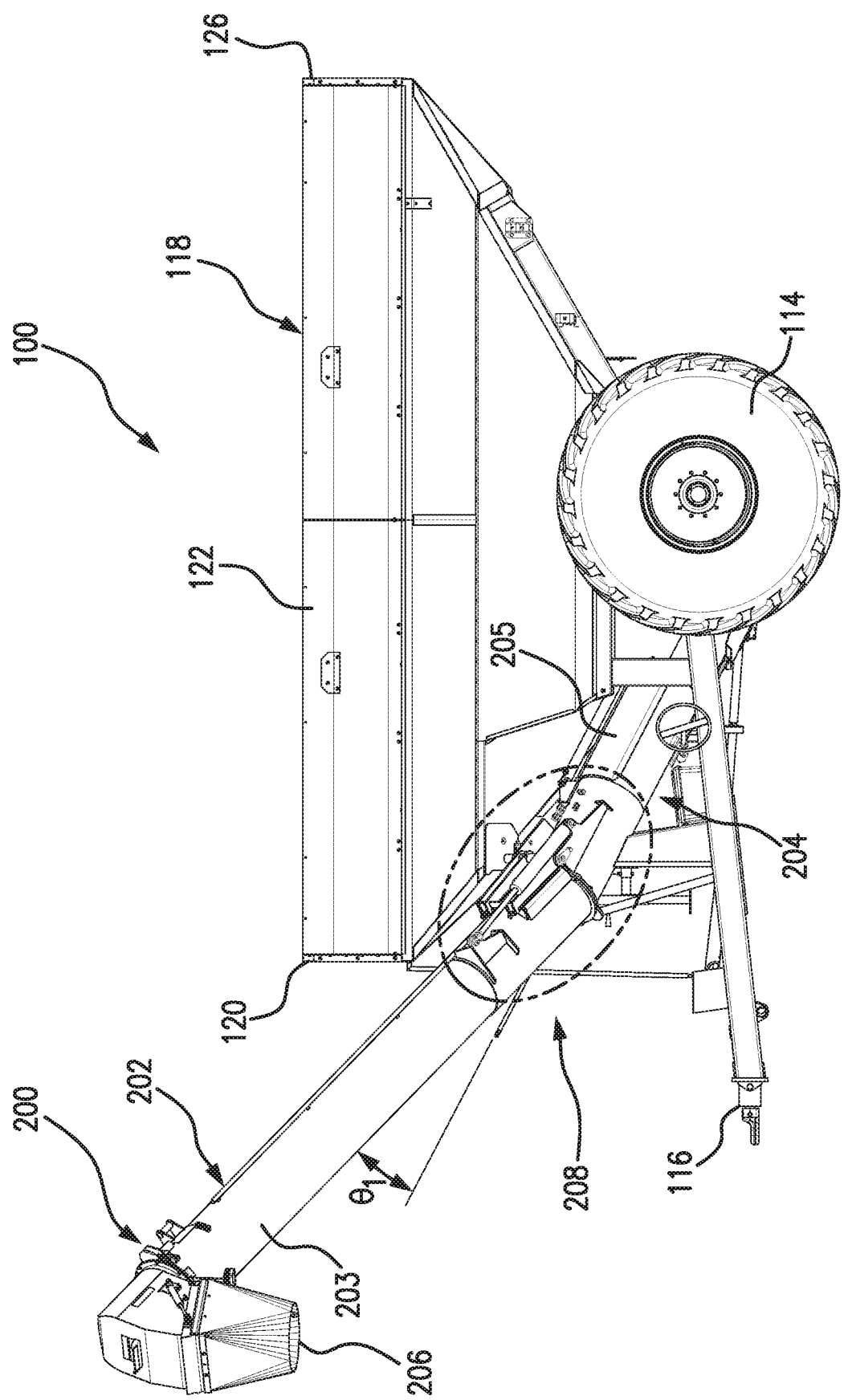
FIG. 1 is a side view of a grain cart having an auger assembly set in the operating position according to an exemplary embodiment.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

Figure 2:
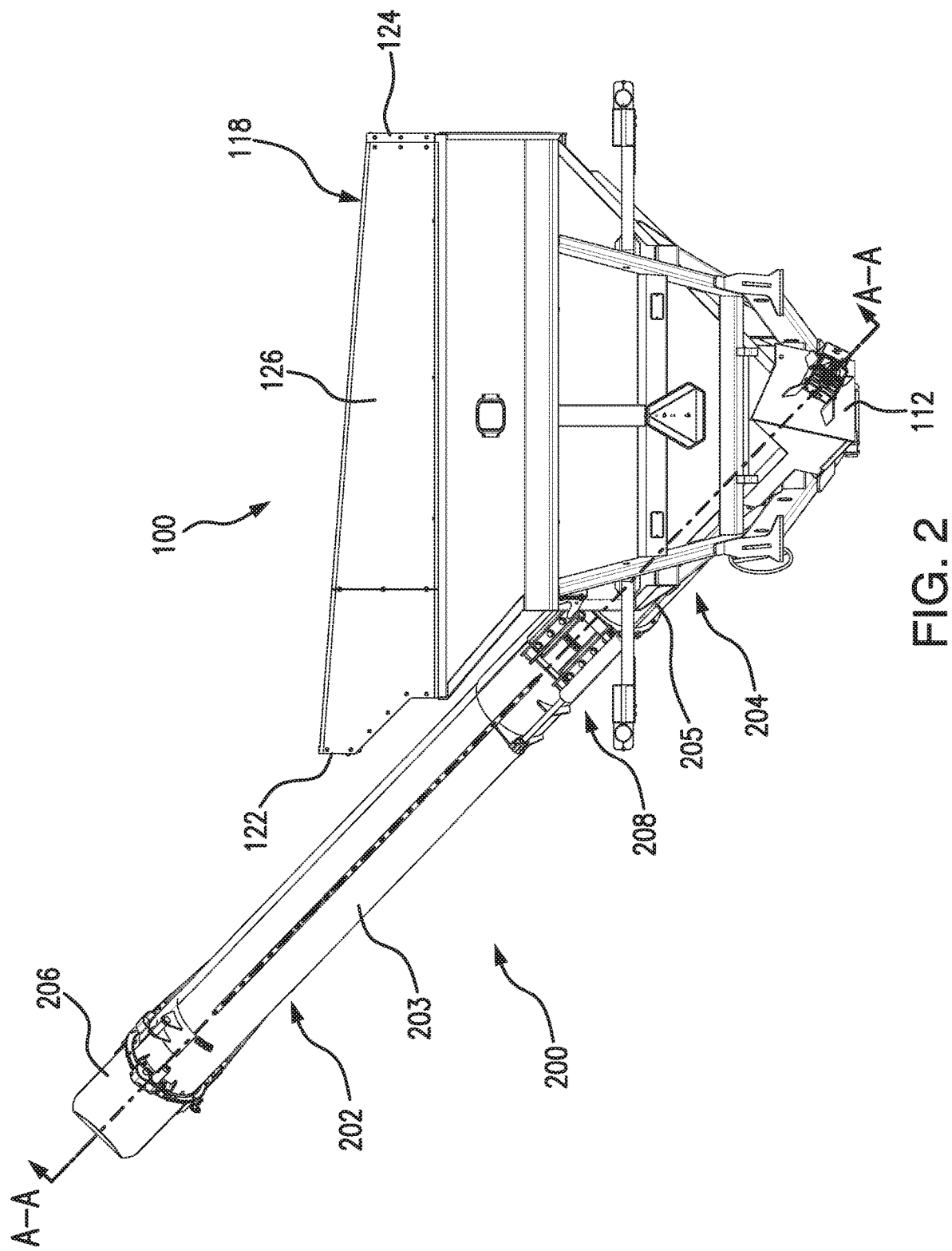
FIG. 2 is a rear view of a grain cart having an auger assembly set in the operating position with wheel omitted from the figure according to an exemplary embodiment.
Figure 3:
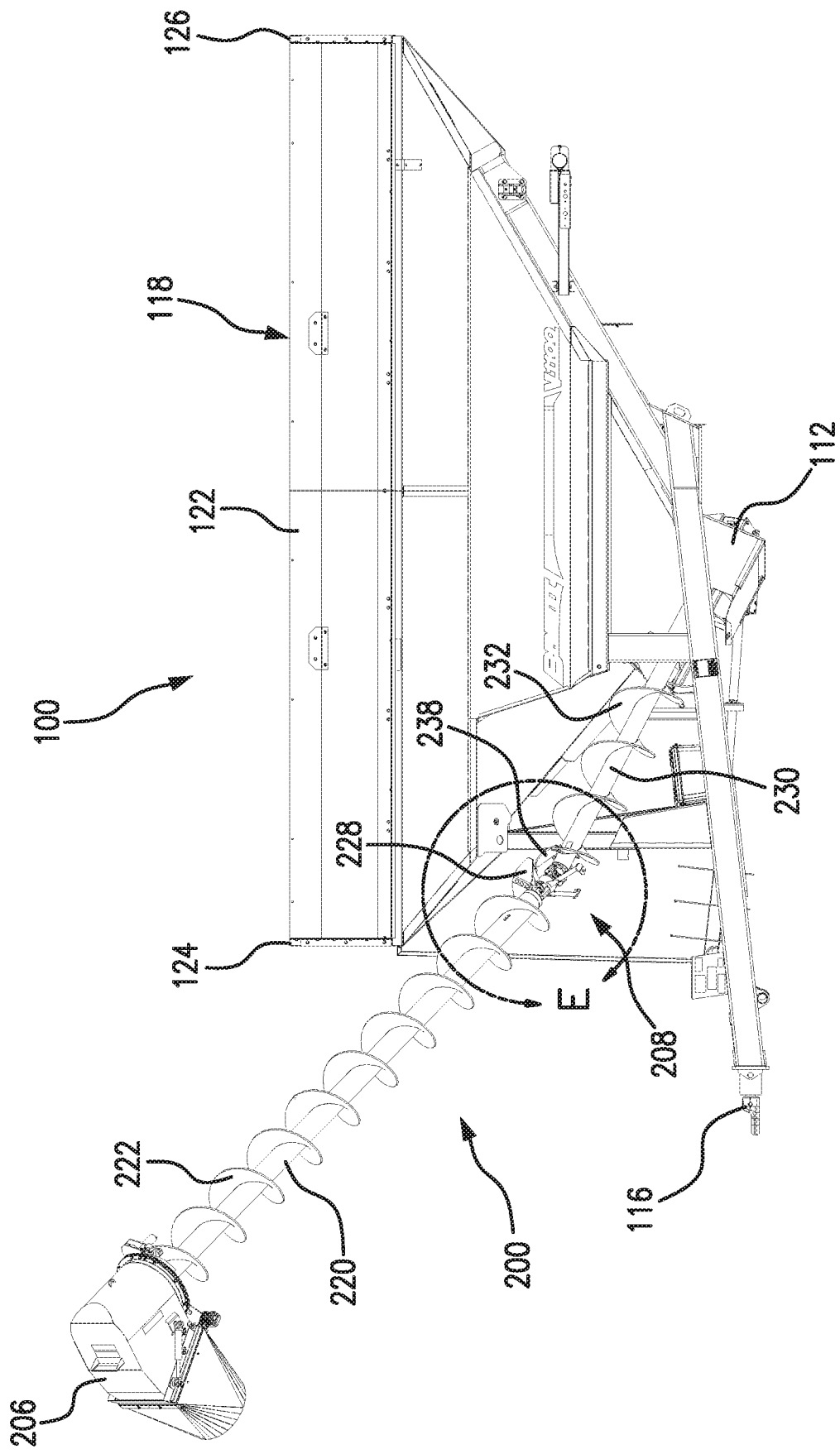
FIG. 3 is a side view of a grain cart having an auger assembly set in the operating position with the wheel and the tubular housing omitted from the figure according to an exemplary embodiment.

FIGS. 1-3 depict a grain cart 100 with a folding auger assembly 200 in an operating position according to one embodiment of the present disclosure. The grain cart 100 includes a grain holding container or hopper 118 mounted on a frame with wheels 114 and a hitch 116. The frame may also include tracks for moving the grain cart 100. The hopper 118 has a front wall or side 120, laterally opposed side walls 122 and 124, and a rear wall or side 126, which together define a grain holding space with an open top and a bottom. An intake or receiving portion 112 of the auger assembly 200 forms a sump proximate the base or bottom of the hopper 118 to draw grain from the bottom of the hopper 118 into the auger assembly 200. In some embodiments, the intake draws grain from the bottom of the hopper into the auger assembly 200 by gravity, while in other embodiments grain is fed into auger assembly 200 by another auger or conveyor. The auger assembly 200 extends upwardly from the intake portion 112 to a discharge portion 206 laterally and forwardly spaced from the hopper 118 to facilitate discharge of grain from the auger assembly 200 into another container such as, for instance, another grain cart, semi-trailer, or rail car located to the side of the grain cart 100.

As shown in FIGS. 1-3, the auger assembly 200 includes an upper auger section 202 and a lower auger section 204. The lower auger section 204 extends from intake portion 112 near the bottom of hopper 118 to a front corner of the hopper 118 where the one of the laterally opposed side walls 122 or 124 intersects front wall 120. In some embodiments, lower auger section 204 extends from intake portion 112 to a point proximally adjacent to a front corner, immediately adjacent to a front corner, or disposed at or substantially at a front corner of the hopper. The upper auger section 202 is connected to the lower auger assembly section 204 by a joint assembly 208 (shown in FIGS. 4 and 5) that allows the upper auger section 202 to be moved between an operating position extending laterally and forwardly outward from the front corner of the hopper 118 and a transport position folded across the side of the hopper 118. In other embodiments (not shown), the joint assembly 208 is configured to connect the upper auger section 202 with the lower auger section 204 such that the upper auger section 202 may be moved between an operating position extending laterally and forwardly outward from the forward corner of the cart and a transport position folded diagonally across the front of the cart, such as one of the auger assemblies described in U.S. Pat. No. 9,039,340, entitled "Grain Cart with Folding Auger"; the entire contents of which are herein incorporated by reference.

In one embodiment, the joint assembly 208 is configured such that, in the operating position, the upper auger assembly portion 202 is angularly offset from the lower auger assembly portion 204 to the discharge portion 206 at an elevated position forwardly and to the side of the hopper 118. That is, a longitudinal axis of the upper auger assembly portion 202 may in one embodiment intersect a longitudinal axis of the lower auger assembly portion 204 at an angle $\theta_1$ (see FIG. 1). The discharge portion 206 has a rotatable opening or spout that may be positioned to discharge grain from the auger assembly 200 into a grain trailer or another grain cart located to the side of grain cart 100.

In one embodiment, the joint assembly 208 is configured such that, in the transport position, the upper auger section 202 is folded at the joint assembly 208 to extend rearwardly along a side of cart 100. In the transport position of this embodiment, the entire auger assembly 200 is disposed substantially within the external dimensional boundaries of the grain cart. In accordance with some embodiments, the upper auger section 202 may fit within the external dimensional boundaries of the grain cart, when in the transport position, or extend past it, e.g., past the rear of cart 100.

Figure 7:
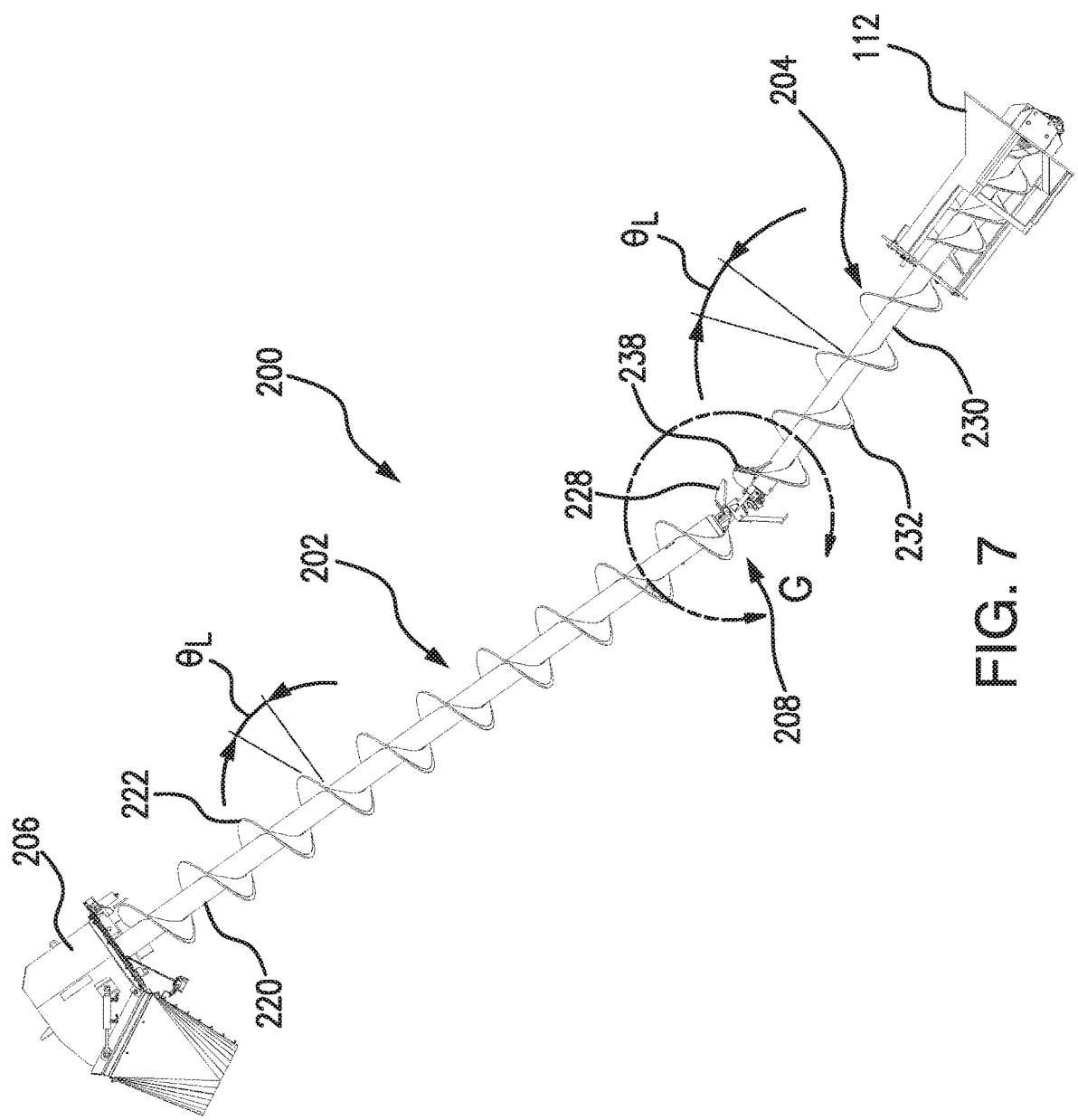
FIG. 7 is a side view of the auger assembly of the auger assembly with the tubular housing omitted from the figure according to an exemplary embodiment.
Figure 8:
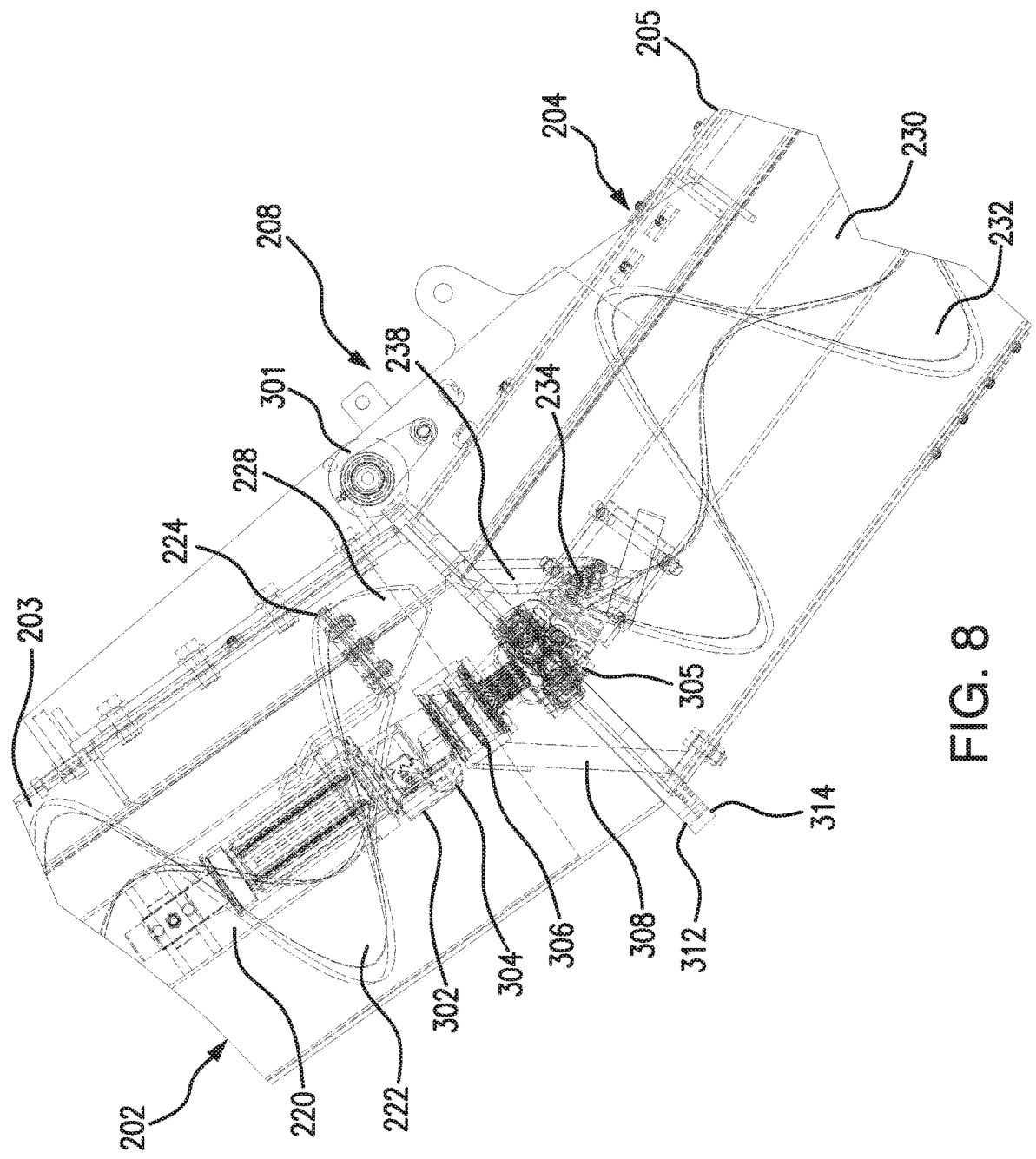
FIG. 8 is a detailed view of the joint assembly coupling the upper auger section to the lower auger section with auger assembly set in the operating position, and the tubular housing depicted as transparent, according to an exemplary embodiment.

Referring to FIGS. 1-3 and 6-8, the upper auger section 202 comprises a tubular-shaped upper housing 203 and an upper auger shaft 220 disposed within the upper housing 203. In the illustrated embodiment, the upper auger shaft 220 defines the longitudinal axis of the upper auger section 202 and is configured to rotate about the longitudinal axis of the upper auger section 202. The upper auger section 202 further comprises an upper helical flight array 222 disposed along and projecting from the upper auger shaft 220 in a radial direction. As shown in FIGS. 5 and 9-11, the upper helical flight array 222 terminates at a leading edge 224, which is disposed at an end of the upper auger shaft 220. Referring to FIGS. 7 and 8, the upper helical flight array 222 extends at a lift angle $\theta_L$ relative to a center cross-section of the upper auger shaft 220 and defines a helical path formed between an inner surface of the upper housing 203 and the auger shaft 220 such that agricultural material is conveyed along the helical path as the upper auger shaft 220 rotates in the upper housing 203.

Figure 11A:
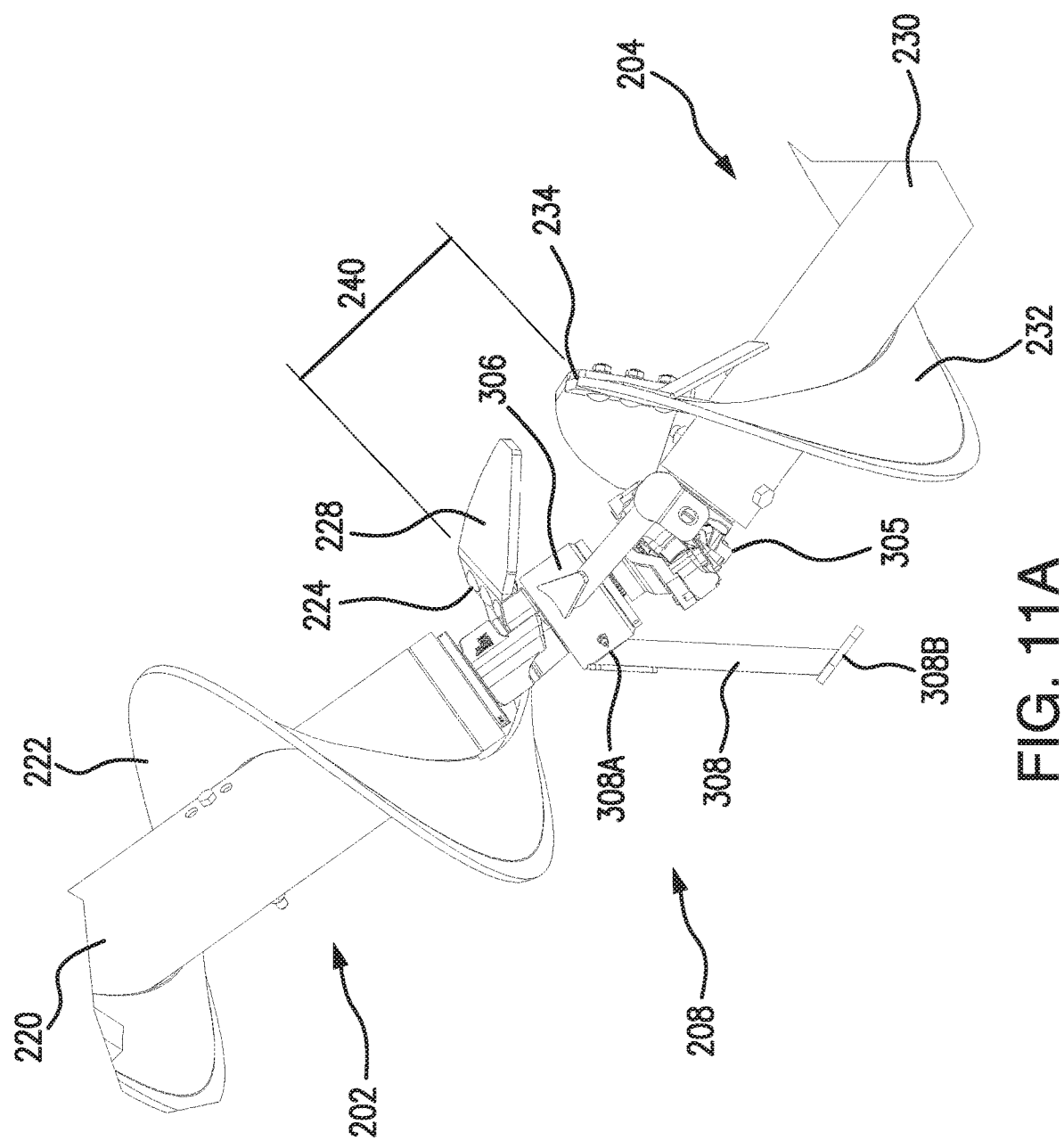
FIG. 11A is a detailed view of the joint assembly coupling the upper auger section to the lower auger section with the auger assembly set in the operating position, and the tubular housing and the flange are omitted from the figure, according to an exemplary embodiment.
Figure 11B:
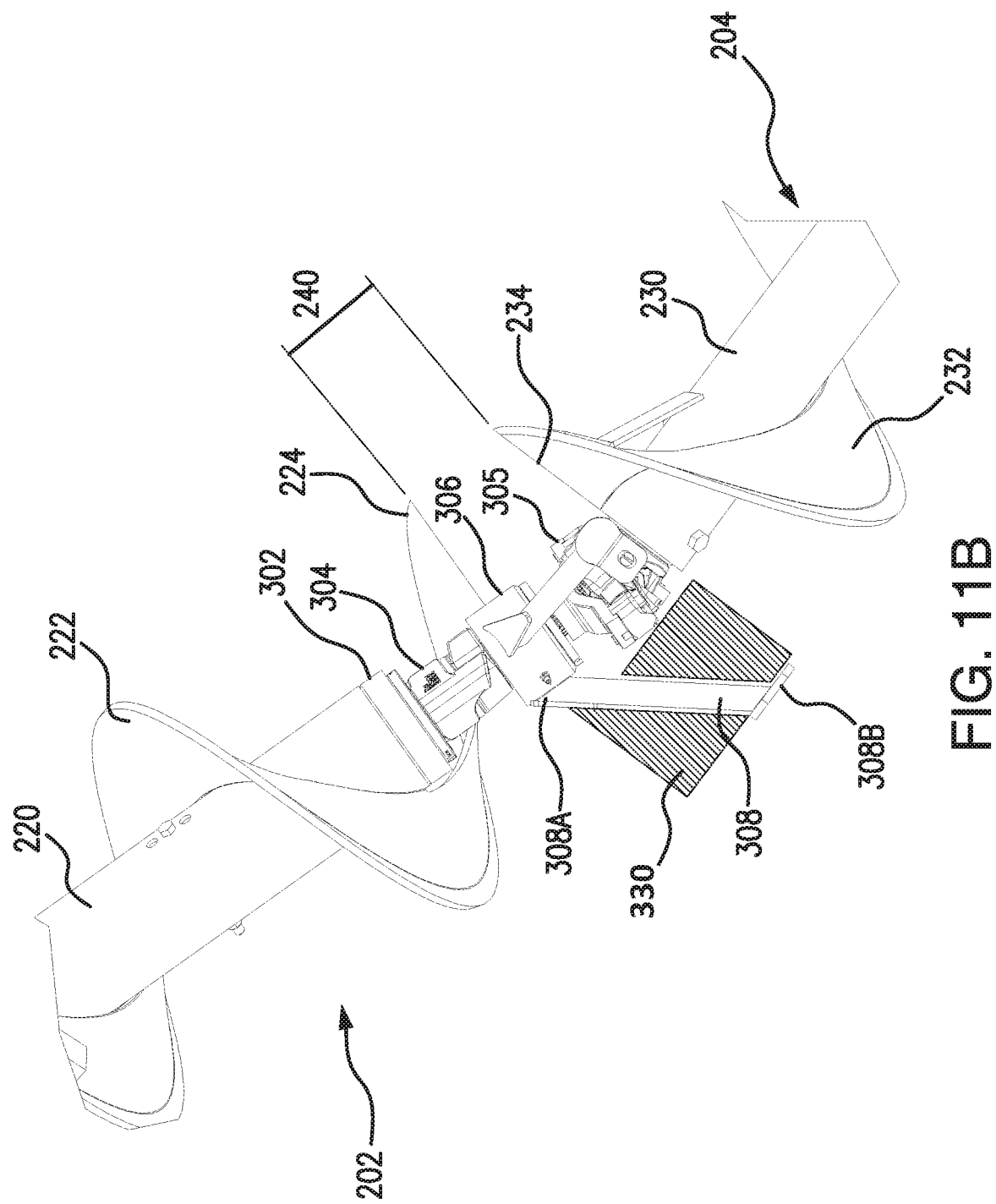
FIG. 11B a detailed view of the joint assembly coupling the upper auger section to the lower auger section with the auger assembly set in the operating position, and the tubular housing, the flange, and the upper and lower flight extensions are omitted from the figure, according to an exemplary embodiment.
Figure 12:
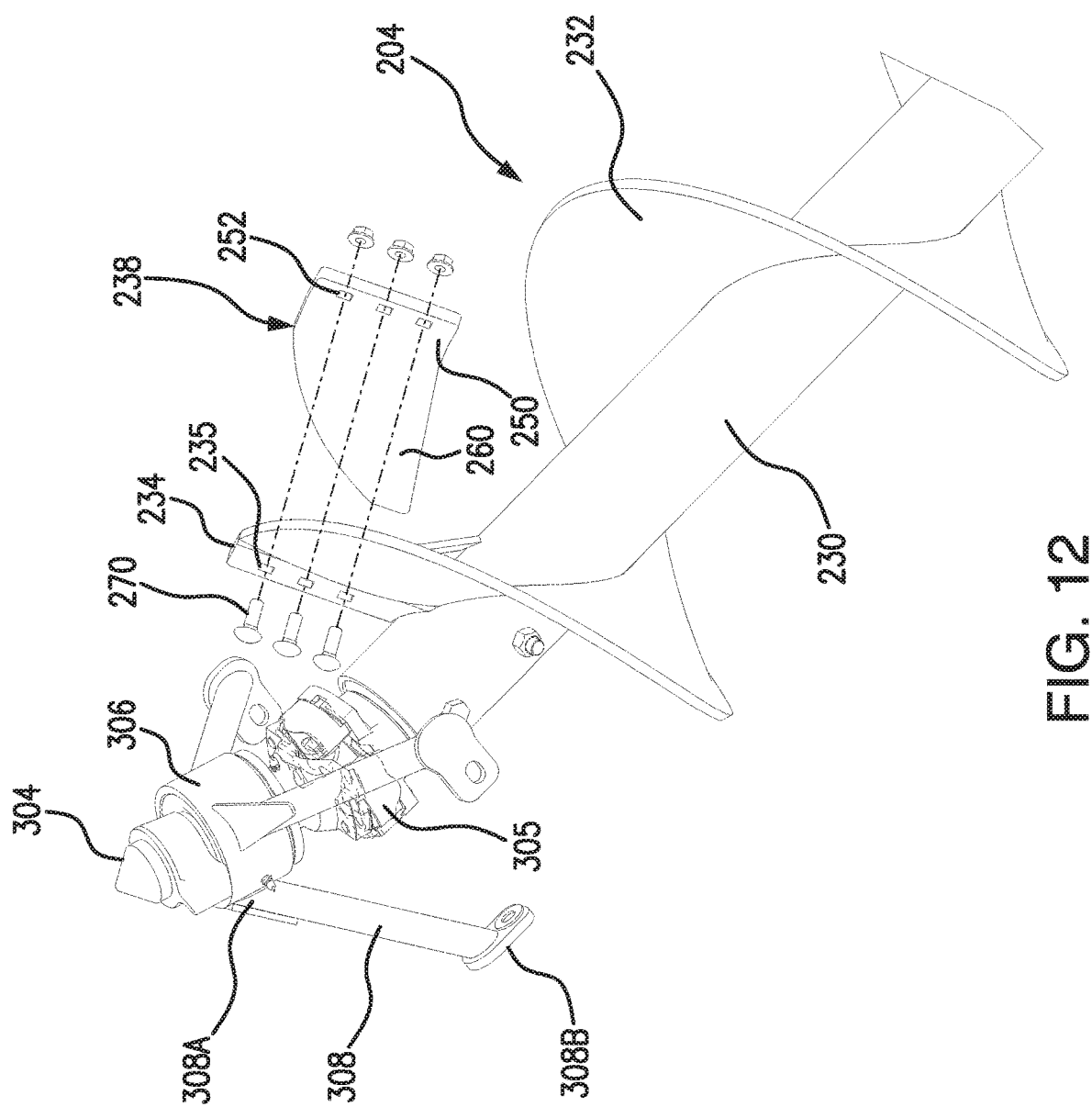
FIG. 12 is an exploded view of a lower flight extension, the end of a lower auger shaft and the lower helical flight array, and the joint according to an exemplary embodiment.

Referring to FIGS. 1-3 and 6-8, the lower auger section 204 comprises a tubular-shaped lower housing 205 and a lower auger shaft 230 disposed within the lower housing 205. In the illustrated embodiment, the lower auger shaft 230 defines the longitudinal axis of the lower auger section 204 and is configured to rotate about the longitudinal axis of the lower auger section 204. The upper auger section 202 further comprises an upper helical flight array 222 disposed along and projecting from the upper auger shaft 220 in a radial direction. As shown in FIGS. 5 and 9-11, the lower helical flight array 232 terminates at a trailing edge 234, which is disposed at an end of the lower auger shaft 230. The lower helical flight array 232 extends at a lift angle $\theta_L$ relative to a center cross-section of the lower auger shaft 230 and defines a helical path formed between an inner surface of the lower housing 205 and the lower auger shaft 230 such that agricultural material is conveyed along the helical path as the lower auger shaft 230 rotates in the lower housing 205. Referring to FIGS. 10 and 11A-B, the trailing edge 234 of the lower helical flight array 232 is spatially separated from the leading edge 224 of the upper helical flight array 222 by a gap 240 when the auger assembly 200 is set in the operating position. In some embodiments, the pitch length between adjacent tips of the upper and the lower flight arrays 222, 232 is substantially equal to the outside diameter of the upper and lower flight arrays 222, 232 such that the lift angle $\theta_L$ is about 22.5°.

Figure 4:
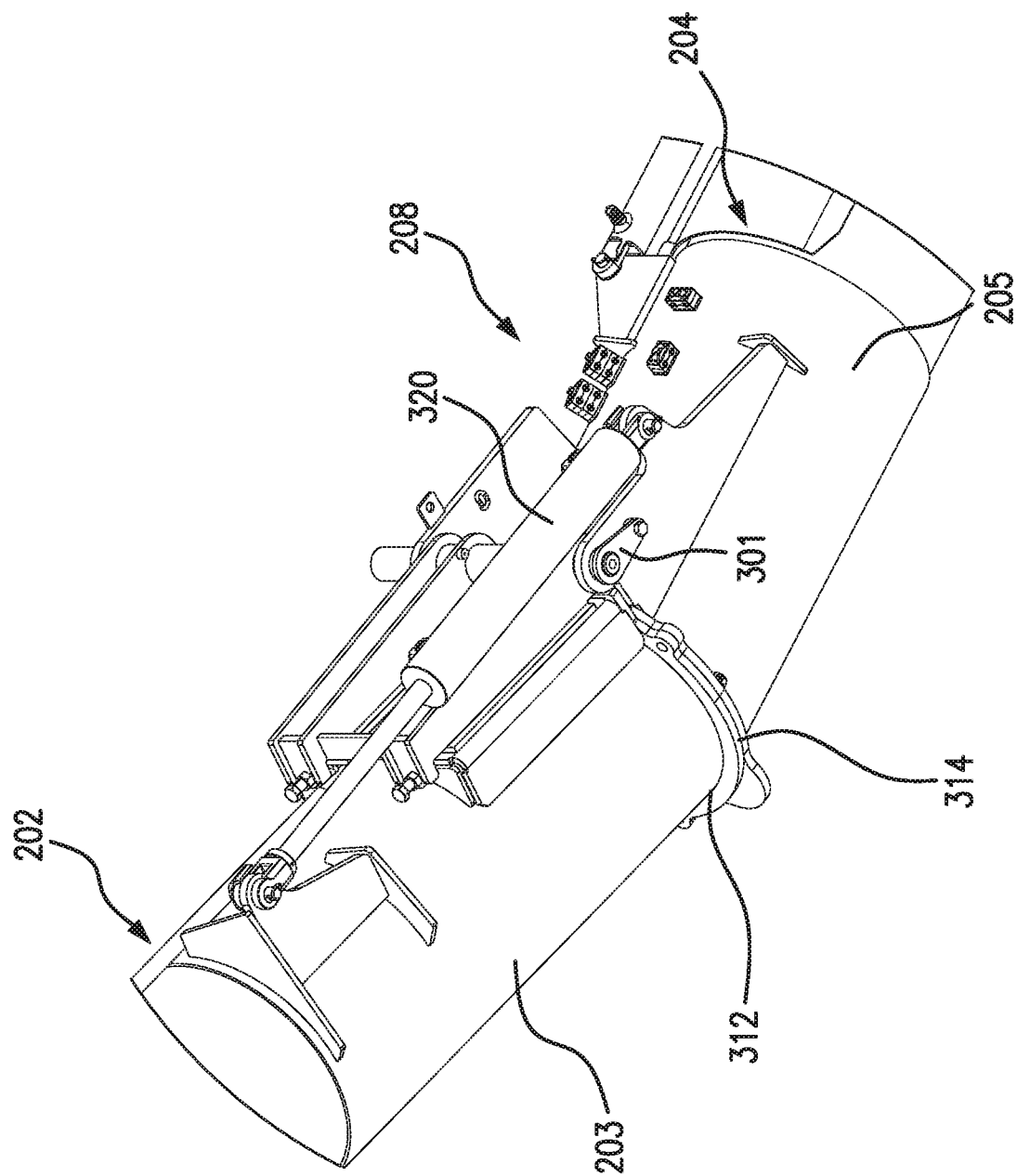
FIG. 4 is a detailed view of the joint assembly coupling the upper auger section to the lower auger section with auger assembly set in the operating position according to an exemplary embodiment.
Figure 5:
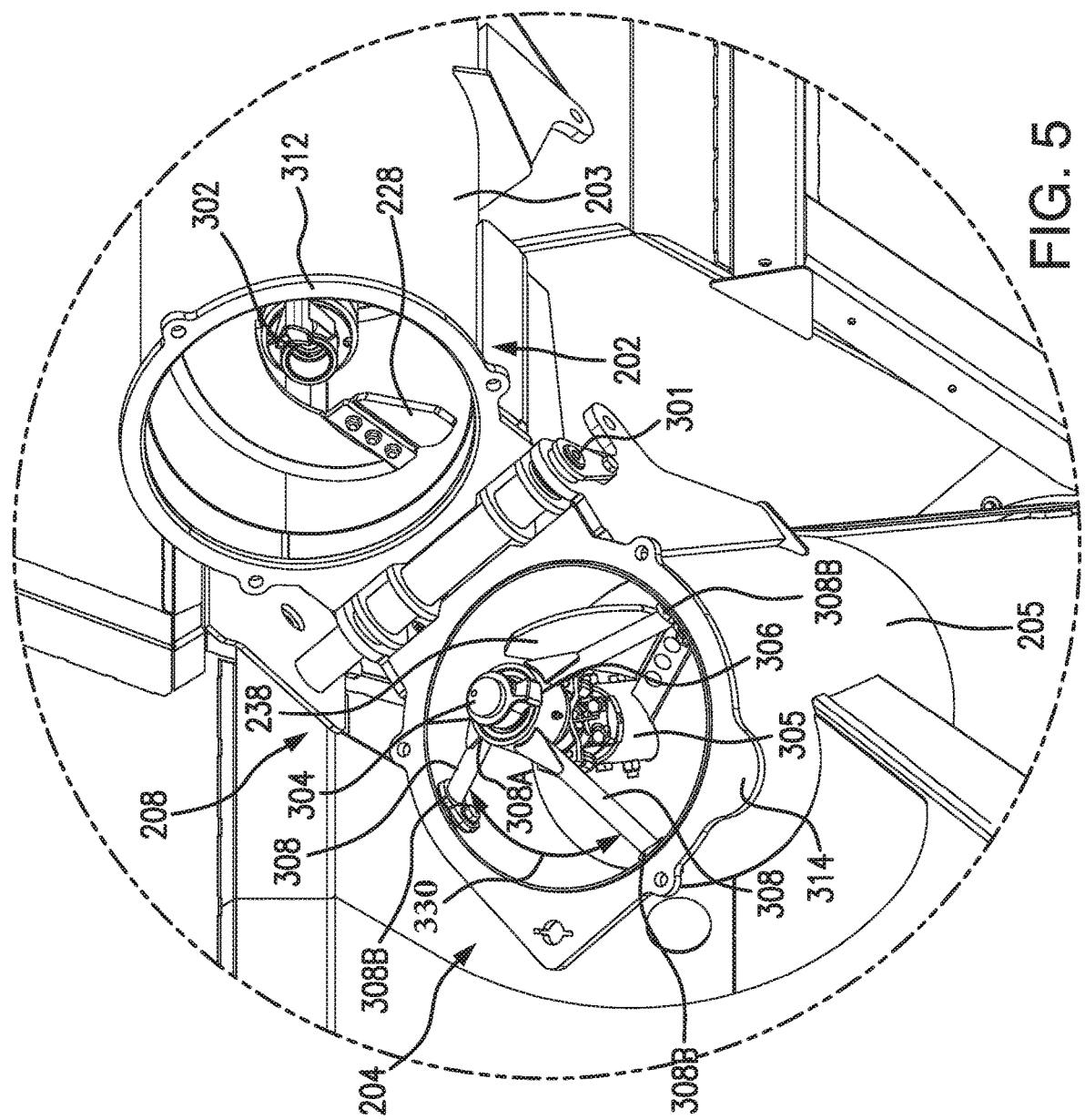
FIG. 5 is a detailed view of the joint assembly coupling the upper auger section to the lower auger section with auger assembly set in the transport position according to an exemplary embodiment.
Figure 6:
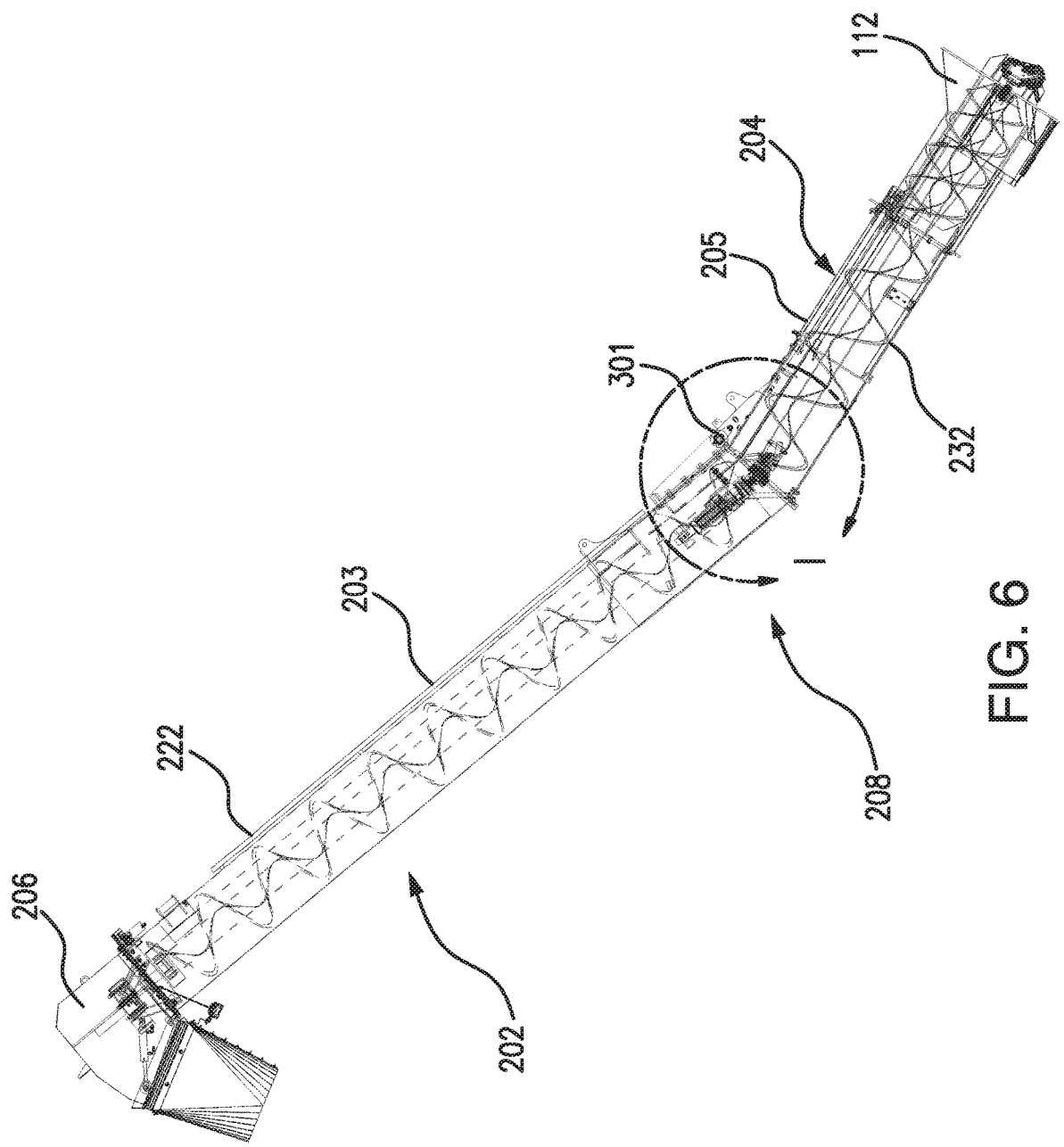
FIG. 6 is a side view of the auger assembly with the tubular housing depicted as transparent according to an exemplary embodiment of the present invention.

In accordance with a non-limiting embodiment, joint assembly 208 coupling the upper auger section 202 to the lower auger section 204 with an angular offset (see FIG. 1) is further illustrated in FIGS. 4 and 5. As shown in FIGS. 4 and 5, joint assembly 208 may include a hinge pin 301 having a pivot axis. The hinge pin 301 is oriented to cause the upper auger section 202 to fold in the manner described. In other words, the hinge pin 301 defines the pivot axis about which the upper auger section 202 may be folded. The hinge pin 301 may be oriented such that the upper auger section 202 and the lower auger section 204 can be rotated about one another in an operating state. Referring to FIG. 4, the joint assembly 208 comprises a hydraulic actuator 320 operatively connected to the upper auger section 202 and the lower auger section 204. The hydraulic actuator 320 is configured to expand and retract to move or pivot the upper auger section 202 between the transport and operating positions.

As shown in FIG. 5, in some embodiments, the joint assembly 208 may include an upper auger coupling portion 302, a lower auger coupling portion 304, a joint 305, a bearing hanger 306, support legs 308, and flanges 312 and 314. As shown in FIGS. 10 and 11A-B, the upper coupling portion 302, the lower auger coupling portion 304, the joint 305, the bearing hanger 306, and the support legs 308 are disposed in the gap 240 defined between the leading and trailing edges 224, 234 of the upper and lower helical flight arrays 222, 232. Referring to FIG. 11B, the gap 240 provides void space between the helical flight arrays 222, 232 to accommodate for the joint 305 and the bearing hanger 306.

As shown in FIG. 5, in the illustrated embodiment, flange 312 projects radially from the end of the upper housing 203, and flange 314 projects radially from the end of the lower housing 205. Flange 312 is configured to abut flange 314 when the auger assembly 200 is set in the operating position, and flange 312 is configured to be spatially separated from flange 314 when the auger assembly 200 is set in the transport position. In some embodiments, one or both of a plane formed by flange 312 and a plane formed by flange 314 may be skewed relative to the longitudinal axis of upper auger section 202 and lower auger section 204.

Referring to FIGS. 5, 8, and 11A-B, in the illustrated embodiment, the lower auger coupling portion 304 is disposed at the end of the lower auger shaft 230 and is connected to the lower auger shaft 230 by a joint 305. The upper auger coupling portion 302 is disposed at the end of the upper auger shaft 220 and is configured to releasably connect to the lower auger coupling portion 304 when the when the auger assembly 200 is in the operating position. In the illustrated embodiment, the upper coupling portion 302 is configured to connect to the lower coupling portion 304 by receiving an upper end of the lower coupling portion 304. As shown in FIGS. 5, 8 and 11B, the bearing hanger 306 circumscribes a lower end of the lower auger coupling portion 304. Referring to FIGS. 5, 11A, 11B, and 12, each support leg 308 comprises a proximal end 308A connected to the bearing hanger 306 and a distal end 308B connected to the housing 205 of the lower auger section 204 such that the bearing hanger 306 and the support legs 308 hold the lower auger shaft 230 and the lower auger coupling portion 304 in a desired orientation relative to the lower housing 205. In the illustrated embodiment, the bearing hanger 306 and support legs 308 hold the lower auger coupling portion 304 and the lower auger shaft 230 at angular offset position relative to the upper auger coupling portion 302 and the upper auger shaft 220 when the auger assembly 200 is set at the operating position.

Referring to FIG. 8, when the auger assembly 200 is set in the operation position, the upper end of the lower auger coupling portion 304 is received in the upper auger coupling portion 302, and the bearing hanger 306 is disposed in the upper housing 203. The support legs 308 extend in a radial direction from the bearing hanger 306 toward the lower housing 205 and an axial direction from the upper auger section 202 to the lower auger section 204, in which the proximal end 308A of each support leg 308 is disposed in the upper housing 203 and the distal end 308B of each support leg is connected to the lower housing 205. As shown in FIGS. 5 and 11B, the support legs 308 are circumferentially spaced apart along the contour of the bearing hanger 306 such that void regions 330 are defined between each pair of adjacent support legs 308. Referring to FIGS. 5 and 11B, each void region 330 extends in an axial direction defined between distal and proximal ends 308A, 308B of the support legs 308 and extends in a circumferential direction defined between adjacent pair of support legs 308.

In some embodiments, the joint 305 comprises a drive configured to transmit rotation forces from the lower auger shaft 230 to the upper auger shaft 220. According to some embodiments of the present disclosure, the joint 305 connecting the lower auger coupling portion 304 to lower auger shaft 230 is a universal joint (also known as a universal coupling, a U-joint, a Cardan joint, a Hardy-Spicer joint, or a Hooke's joint). However, any joint that allows the transfer of rotational motion through an angle would be acceptable. In a non-limiting embodiment, when the flanged ends 312 and 314 abut one another, the upper and lower auger sections 202 and 204 are angled relative to each other, and the upper and lower auger coupling portions 302 and 304 mate together to cause concurrent rotation of the upper and lower auger shafts 220, 230 within their respective housings to draw grain from the container and discharge it into another container. In other embodiments (not shown), the joint assembly 208 may include a bearing hanger and support legs disposed at the both the end of the lower auger shaft 230 and the end of the upper auger shaft 220.

According to some embodiments of the present disclosure, the upper auger section 202 is offset from the lower auger section 204 by an operating offset angle $\theta_1$ (shown in FIG. 1). That is to say that a line (i.e., a longitudinal axis) running through the center of the lower auger section 204 would be offset by an operating offset angle $\theta_1$ from a line (i.e., a longitudinal axis) running through the center of the upper auger section 202. As illustrated in FIG. 1, the offset angle increases side reach of the auger assembly 200 by positioning the upper auger section 202 laterally to the left. In certain embodiments, operating offset angle $\theta_1$ ranges from about greater than 0° to about 20°, or about 15° to 19°. In certain embodiments, operating offset angle $\theta_1$ is about 17.5°. In accordance with one non-limiting embodiment, an offset angle of about 17.5° can be utilized to provide desirable side reach and forward reach of the upper auger section 202. While the upper and lower auger sections need not be co-linear, in other embodiments, the upper and lower auger sections are co-linear, and do not form an operating offset angle.

Referring to FIGS. 3, 5, and 7-13, the auger assembly 200 comprises an upper flight extension 228 detachably mounted to the leading edge 224 of the upper helical fight array 222 and a lower flight extension 238 detachably mounted to the trailing edge 234 of the lower helical fight array 232. In other embodiments (not shown), the auger assembly 200 may comprise only an upper flight extension 228 that is detachably mounted to the leading edge 224 of the upper helical flight array 222. In other embodiments (not shown), the auger assembly 200 may comprise only a lower flight extension 238 that is detachably mounted to the trailing edge 234 of the lower helical flight array 232.

As shown in FIG. 13, the upper flight extension 228 and the lower flight extension 238 each comprise a flange portion 250 and a blade portion 260. The flange portion 250 includes one or more mounting holes 252 configured to receive one or more fasteners 270 such that the flight extension 228, 238 may be detachably mounted to the leading and trailing edges 224, 234 of a respective helical flight array 222, 232. The one or more mounting holes 252 may be aligned with the one or more mounting holes 235 defined along the leading and trailing edges 224, 234 of the upper and lower helical flight arrays 222, 232 so that a fastener 270 may extend through the aligned mounting holes 252, 235 thereby securing the flight extension 228, 238 to the leading and trailing edges 224, 234 of the helical flight array 222, 232. In some embodiments, the fastener 270 may include a screw, bolt, or rivet, which extends through the mounting holes 252 and 235 to secure the flight extension 228, 238 to the flight array 220, 230.

As shown in FIG. 13, according to some embodiments, the flange portion 250 forms a rectangular shape extending between a first end 254 and a second end 256 to define a first plane 251. In the illustrated embodiment, the first plane 251 defined by the flange portion 250 extends in a direction parallel to the lift angle $\theta_L$ of the upper and lower helical flight arrays 222, 232. In some embodiments, the blade portion 260 forms a fin-shape surface projecting away from the flange portion 250 and defining a second plane 261 that extends obliquely to the first plane 251, thereby defining an angle of deflection $\theta_2$ between the first and second planes 251, 261. In some embodiments, the angle of deflection $\theta_2$ may be adjusted without departing from the scope of the present disclosure. For example, in some embodiments, the maximum angle of deflection $\theta_2$ is set at a first predetermined value to prevent an over aggressive deflection angle that would cause damage to agricultural material ricocheting from the blade portion 260. For example, in some embodiments, the minimum angle of deflection $\theta_2$ is set a second predetermined value, which is less than the first predetermined value, to curtail the length of the blade portion 260. As the angle of deflection $\theta_2$ decreases, the length of the blade portion 260 needs to increase to extend along the gap 240. In the illustrative embodiment, the angle of deflection $\theta_2$ between the first and second planes 251, 261 of the flight extension 228, 238 is set to be greater than the lift angle $\theta_L$ of the upper and lower helical flight arrays 222, 232. In some exemplary embodiments, the angle of deflection $\theta_2$ may range from 20° to 30° more than the lift angle $\theta_L$. In some embodiments, the lift angle $\theta_L$ for the flight arrays 222, 232 is set at about 22.5° and the angle of deflection $\theta_2$ for the flight extensions 228, 238 ranges from 45° to 55°. By setting the angle of deflection $\theta_2$ to be greater than the lift angle $\theta_L$ of the upper and lower helical flight arrays 222, 232, the blade portion 260 is configured to generate more lift applied to the agricultural material, thereby accelerating the movement of agricultural material conveyed between the lower and upper sections 204, 202 of the auger assembly 200. Accordingly, even when the auger assembly 200 is operating at a low speed (e.g., less than 500 RPM), the flight extensions 228, 238 help generate a sufficient amount of lifting force to move the agricultural material through the gap 240 between the trailing edge 234 of the lower auger flight array 232 and the leading edge 224 of the upper auger flight array 222.

In the illustrated embodiment shown in FIG. 13, the blade portion 260 includes a flat edge 262, a curved edge 264, and a tip 266, in which the flat edge 262 and the curved edge 264 converge at the tip 266 to define a face 268 of the blade 260. The flat edge 262 projects from a first end 254 of the flange portion and extends substantially transverse to the tip 266. The curved edge 264 extends from the tip 266 to a second end 256 of the flange portion 250. In some embodiments, the shape of the blade 260 may be altered without departing from the scope of the present disclosure. However, the shape of the blade 260 must be configured to accommodate room for the components of the joint assembly 208, such as, for example, the joint 305, the bearing hanger 306, and the support legs 308, so that the flight extensions 228, 238 do not interfere with the operation of the joint assembly 208.

Referring to FIGS. 3 and 7-11A, the upper flight extension 228 and the lower flight extension 238 each extend into the gap 240 defined between the leading and trailing edges 224, 234 of the upper and lower auger flight arrays 222, 232 when the auger assembly 200 is set in the operating position. In one embodiment, the lower flight extension 238 projects from the trailing edge 234 of the lower helical flight array 232 in a direction such that the blade portion 260 of the lower flight extension 238 follows the helical path defined by the lower auger flight array 232. Accordingly, the lower flight extension 238 is configured to lift agricultural material that has been conveyed along the lower helical flight array 232 and direct the agricultural material into the upper auger section 202. In one embodiment, the upper flight extension 228 projects from the leading edge 224 of the upper helical flight array 222 such that the blade portion 260 of the upper flight extension 228 follows the helical path defined by the upper auger flight array 222. Accordingly, the upper flight extension 228 is configured to catch agricultural material that has been conveyed from the lower auger section 204 and direct the agricultural material along the upper helical flight array 222 toward the discharge portion 206.

Figure 9:
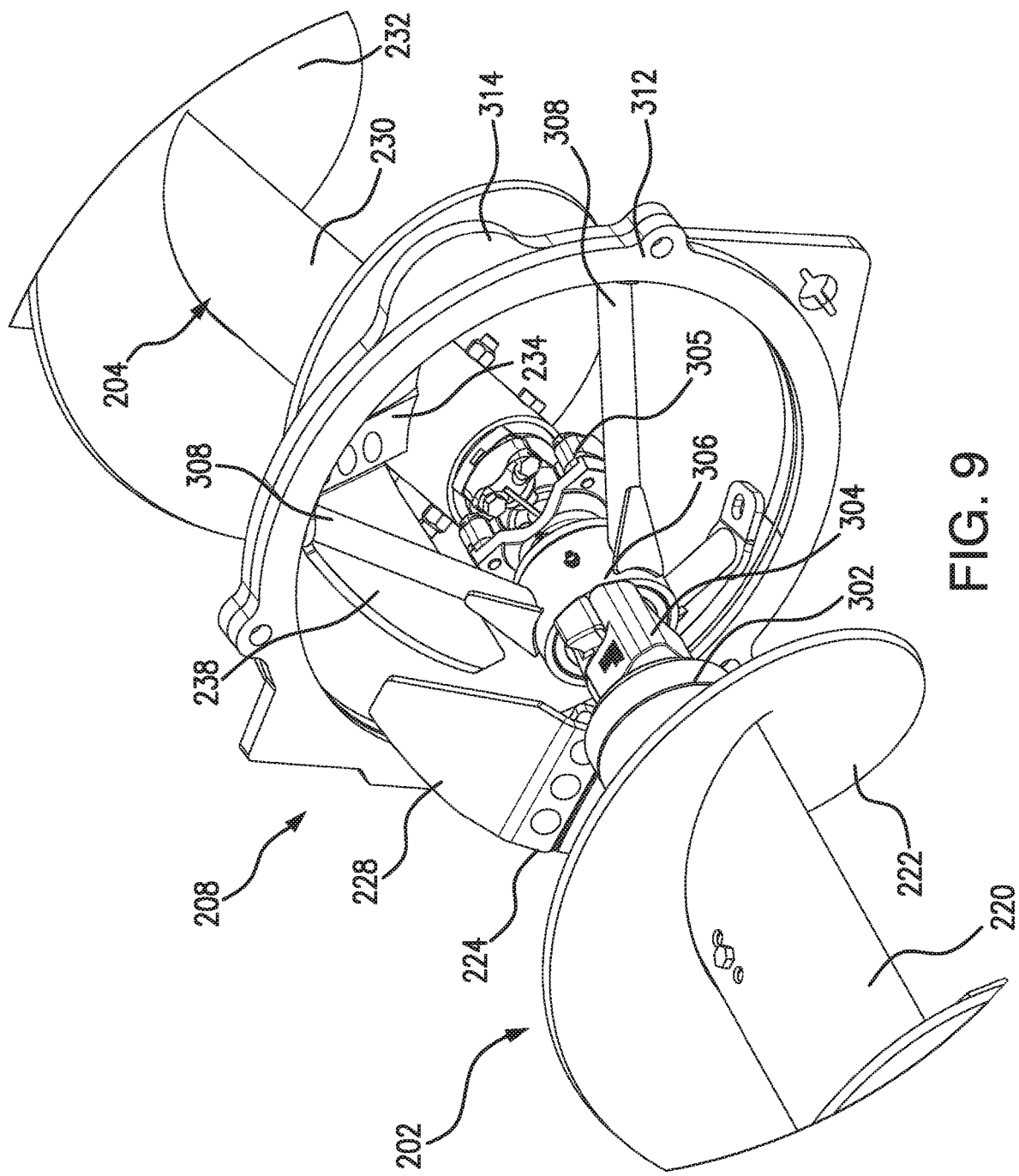
FIG. 9 is a detailed view of the joint assembly coupling the upper auger section to the lower auger section with the auger assembly set in the operating position, and the tubular housing is omitted from the figure, according to an exemplary embodiment.

As shown in FIG. 9, the upper and lower flight extensions 228, 238 extend into one of the void regions 330 defined between a respective pair of adjacent support legs 308. In the illustrated embodiment, the lower flight extension 238 extends toward the leading edge 224 of the upper helical flight array 222, and the upper flight extension 228 extends toward the trailing edge 234 of the lower helical flight array 232. In some embodiments, the upper and lower flight extensions 228, 238 may be used to facilitate the movement of agricultural material just along the joint 305 or just along the bearing hanger 306. In some embodiments, the upper and lower flight extensions 228, 238 may be used to facilitate the movement of agricultural material just along the joint 305 by being radially offset while overlapping axially.

The presence of the upper and lower flight extensions 228, 238 minimizes the void space formed along the gap 240 between the leading edges 228, 238 of the upper and lower helical flight arrays 222, 232 when the auger assembly 200 is set in the operating position. By minimize the void spaced formed along the gap 240 between the leading edges 228, 238 of the upper and lower helical flight arrays 222, 232, the upper and lower flight extensions 228, 238 ensure that the agricultural material lifted at the trailing edge 234 of the lower helical flight array 232 is caught by the upper helical flight array 222, thereby reducing the likelihood of agricultural material getting stuck at the joint between the upper and lower auger sections 202, 204. Accordingly, the upper and lower flight extensions 228, 238 ensure that the volume of agricultural material in the auger assembly 200 is evenly distributed throughout the length of the auger assembly 200. By ensuring the even distribution of agricultural material conveyed through the auger assembly 200, the upper and lower flight extensions 228, 238 reduce the torque demand for the auger assembly 200 and reduce the likelihood of wear of the helical flight arrays. Furthermore, because the upper and lower flight extensions 228, 238 reduce the amount of agricultural material packed around the joint 305, the upper and lower flight extensions 228, 238 reduce the likelihood of damage to a seal of the joint 305.

In some embodiments, the upper and lower helical flight extensions 228, 238 are comprised of a high wear resistant material, such alloy steels or alloy irons. In some embodiments, the upper and lower flight extensions 228, 238 are comprised of an abrasion resistance steel, including grades AR235, AR360, and AR400. In some embodiments, the upper and lower flight extensions 228, 238 are comprised of a T-1 alloy steel. In some embodiments, the upper and lower helical flight extensions 228, 238 are comprised a material having a greater wear resistant than the material of the helical flight arrays 224, 234. In some embodiments, each flight extension 228, 238 comprises a first thickness defined as the depth between the faces 268 of the blade 260, and the helical flight arrays 222, 232 comprise a second thickness defined as the depth between the faces of the helical flight array. In some embodiments, the first thickness of the flight extensions 228, 238 is greater than the second thickness of the helical flight array 222, 232. Due to the shape, thickness, and material choice, the upper and lower flight extensions 228, 238 prevent wear damage and extend the operating lifespan of the auger flight arrays 222, 232, particularly at the trailing edge 234 of the lower auger flight array 232 and the leading edge 224 of the upper auger flight array 222.

Because the upper and lower flight extensions 228, 238 are detachably mounted to the auger flight arrays 222, 232, the upper and lower flight extensions 228, 238 may be replaced without servicing or replacing the lower and upper flight arrays 222, 232. Furthermore, because the upper and lower flight extensions 228, 238 are not permanently welded to the helical flight arrays 222, 232, one may service the joint 305 and the bearing hanger 308 by simply detaching and removing the flight extensions 228, 238 from the auger assembly 200. It is easier to profile the shape of the flight extensions 228, 238 to correspond to the shape of the helical flight arrays 222, 232 and to extend into the gap 240 without interfering with the bearing hanger 306 and the support legs 308 compared to profiling the shape of metal strips that are welded to the edges of the helical flight arrays 222, 232.

While the flight extensions 228, 238 described herein have been implemented at a junction between an upper auger section and a lower auger section, the flight extensions 228, 238 may be detachably mounted to the leading or trailing edge of any auger fighting array to increase the operating lifespan of the auger assembly and to promote the movement of granular or agricultural material. The flight extensions 228, 238 described herein may be implemented in other auger assemblies, such as one of the auger assemblies described in U.S. Pat. No. 9,039,340, entitled "Grain Cart with Folding Auger"; the entire contents of which are herein incorporated by reference.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A farm implement comprising:
   a frame;
   a container mounted on said frame and configured to hold agricultural material; and an auger assembly configured to convey agricultural material held in the container, wherein the auger assembly comprises:

a first auger section comprising a first auger shaft configured to rotate about a longitudinal axis of the first auger section and a first helical flight array disposed along and projected from the first auger shaft, and the first helical flight array comprises a leading edge proximate an end of the first auger shaft;

a second auger section comprising a second auger shaft configured to rotate about a longitudinal axis of the second auger section and a second helical flight array disposed along and projected from the second auger shaft, and the second helical flight array comprises a trailing edge proximate an end of the second auger shaft; and a first flight extension coupled to one of the leading edge of the first helical flight array or the trailing edge of the second helical flight array;

wherein the leading edge is spatially separated from the trailing edge by a gap when the auger assembly is set in the operating position, and wherein the first flight extension extends into the gap when the auger assembly is set in the operating position such that the first flight extension is configured to convey agricultural material from the first auger section to the second auger section of the auger assembly.

2. The farm implement of claim 1, wherein the longitudinal axis of the first auger section is oriented at an angular offset relative to said longitudinal axis of the lower auger assembly when the auger assembly is set in the operating position.

3. The farm implement of claim 1, wherein the auger assembly comprises a second flight extension coupled to the other one of the leading edge of the first helical flight array or the trailing edge of the second helical flight array, wherein the second flight extension extends into the gap when the auger assembly is set in the operating position such that the second flight extension is configured to convey agricultural material from the first auger section to the second auger section of the auger assembly.

4. The farm implement of claim 1, wherein the first flight extension comprises a flange portion configured to be mounted to a respective leading or trailing edge of one of the first and second helical flight arrays and a blade portion projecting away from the respective leading or trailing edge of one of the first and second helical flight arrays.

5. The farm implement of claim 4, wherein the flange portion defines a first plane and the blade portion defines a second plane that extends obliquely to the first plane.

6. The farm implement of claim 1, wherein the farm implement is a grain cart.

7. The farm implement of claim 1, wherein the second auger section is pivotable relative to the first auger section between the operating position and a transport position, and the end of the first auger shaft is disconnected from the end of the second auger shaft when the auger assembly is set in the transport position.

8. The farm implement of claim 3, wherein the first flight extension is detachably mounted to the leading edge of the first helical flight array, and the second flight extension is detachably mounted to the trailing edge of the second helical flight array, and wherein the first flight extension extends toward the trailing edge of the second helical flight array, and the second flight extension extends toward the leading edge of the first helical flight array when the auger assembly is set in the operating position.

9. The farm implement of claim 1, wherein the first flight extension is detachably mounted to one of the leading edge of the first helical flight array or the trailing edge of the second helical flight array.

10. The farm implement of claim 3, wherein the second flight extension is detachably mounted to the other one of the leading edge of the first helical flight array or the trailing edge of the second helical flight array.

* * * * *